US007789119B2

(12) United States Patent
Agostini et al.

(10) Patent No.: US 7,789,119 B2
(45) Date of Patent: Sep. 7, 2010

(54) RUNFLAT TIRE

(75) Inventors: Giorgio Agostini, Colmar-Berg (LU); Filomeno Gennaro Corvasce, Mertzig (LU); Christian Kaes, Schrondweiler (LU); Marc Weydert, Strassen (LU); Frank Schmitz, Bissen (LU); Leon Jean Mathias Gregorius, Useldange (LU); Anne Therese Peronnet-Paquin, Luxembourg (LU); Mercedes Maria Diaz-Scharfe, Mersch (LU)

(73) Assignee: The Goodyear Tire & Rubber Company, Akron, OH (US)

( * ) Notice: Subject to any disclaimer, the term of this patent is extended or adjusted under 35 U.S.C. 154(b) by 436 days.

(21) Appl. No.: 11/881,038

(22) Filed: Jul. 25, 2007

(65) Prior Publication Data

US 2008/0178981 A1 Jul. 31, 2008

Related U.S. Application Data

(60) Provisional application No. 60/850,465, filed on Oct. 10, 2006.

(51) Int. Cl.
*B60C 1/00* (2006.01)
*B60C 17/00* (2006.01)
*B60C 17/04* (2006.01)
*B60C 17/06* (2006.01)

(52) U.S. Cl. .................. 152/516; 152/517; 152/520
(58) Field of Classification Search .................. 152/520
See application file for complete search history.

(56) References Cited

U.S. PATENT DOCUMENTS

| 3,994,329 | A | 11/1976 | Masson et al. | 152/353 R |
| 4,193,437 | A * | 3/1980 | Powell | 152/517 |
| 4,517,336 | A | 5/1985 | Wolff et al. | 524/571 |
| 5,008,324 | A | 4/1991 | Killgoar, Jr. et al. | 524/504 |
| 5,439,041 | A | 8/1995 | Siegenthaler | 152/541 |
| 5,696,197 | A | 12/1997 | Smith et al. | 524/495 |
| 5,717,038 | A | 2/1998 | Horpel et al. | 525/332.4 |
| 5,773,504 | A | 6/1998 | Smith et al. | 524/492 |
| 6,121,367 | A | 9/2000 | Corvasce et al. | 524/492 |
| 6,251,994 | B1 | 6/2001 | Wang et al. | 525/127 |
| 6,326,438 | B1 | 12/2001 | D'Sidocky et al. | 525/331.1 |
| 6,355,719 | B1 | 3/2002 | Corvasce et al. | 524/492 |
| 6,426,378 | B1 | 7/2002 | Lickes et al. | 524/262 |
| 6,453,961 | B1 | 9/2002 | Colantonio et al. | 152/517 |
| 6,588,471 | B2 | 7/2003 | Majumdar et al. | 152/209.6 |
| 6,809,137 | B2 | 10/2004 | Matsuo et al. | 524/282 |
| 6,832,637 | B2 | 12/2004 | Majumdar et al. | 152/209.6 |

(Continued)

FOREIGN PATENT DOCUMENTS

EP   0988999   3/1999

(Continued)

OTHER PUBLICATIONS

European Search Report—Jan. 10, 2008.

(Continued)

*Primary Examiner*—Justin Fischer
(74) *Attorney, Agent, or Firm*—John D. DeLong

(57) ABSTRACT

A pneumatic runflat tire including at least one sidewall insert, the at least one sidewall insert including a heterogenous rubber compound comprising first rubber and second rubber composition phases, wherein the second rubber phase is further vulcanizable.

7 Claims, 5 Drawing Sheets

U.S. PATENT DOCUMENTS

| | | | |
|---|---|---|---|
| 2001/0018944 A1* | 9/2001 | Mizuno | 152/547 |
| 2002/0036043 A1 | 3/2002 | Thielen | 152/517 |
| 2002/0062894 A1 | 5/2002 | Miner et al. | 152/517 |
| 2003/0015272 A1 | 1/2003 | Teratani et al. | 152/406 |
| 2003/0088023 A1 | 5/2003 | Motofusa et al. | 525/63 |
| 2004/0014869 A1 | 1/2004 | Wong et al. | 524/493 |
| 2004/0173295 A1* | 9/2004 | Zanzig et al. | 152/209.5 |
| 2006/0060281 A1 | 3/2006 | Kirby | 152/517 |

FOREIGN PATENT DOCUMENTS

| | | |
|---|---|---|
| EP | 1197518 | 4/2002 |
| JP | 04091145 | 3/1992 |
| JP | 10-095875 * | 4/1998 |
| JP | 288297 | 10/2001 |
| JP | 342293 | 12/2001 |

OTHER PUBLICATIONS

Pgs. 1-20, Article, "Testing of Cure Kinetics—A Tool to Improve Tyre Quality," by H. G. Burhin, Tyretech '90, Nov. 5-6, 1990.

Paper No. 41, "Applications for the Curemeter Maximum Cure Rate in Rubber Compound Development and Process Control," American Chemical Society Meeting, May 2-5, 1995.

Flexsys Product Data Sheet, Santocure DCBS, "Accelerators," 2000.
Flexsys Product Data Sheet, Perkalink 900, "Accelerators," 2000.
Flexsys Product Data Sheet, Santocure TBBS, "Accelerators," 2004.
Flexsys Product Data Sheet, Santocure TBSI, "Accelerators," 2004.

* cited by examiner

RUNFLAT TIRE

CROSS REFERENCE TO OTHER APPLICATIONS

This application claims the benefit of Ser. No. 60/850,465 filed Oct. 10, 2006.

BACKGROUND OF THE INVENTION

Various tire constructions have been suggested for pneumatic runflat tires; that is, tires capable of being used while uninflated (with total loss of air pressure other than ambient atmospheric pressure). A vehicle equipped with such tires can continue to be driven after the tire experiences loss of pneumatic pressure, such as loss of air pressure caused by puncture or valve failure. This is highly desirable since it allows vehicles equipped with such runflat tires to continue in operation until they reach a location where the tire can be repaired or replaced. Tires of this type are sometimes also referred to as extended mobility tires (EMT).

The goal of engineering has been to develop a runflat tire without compromising ride or performance. In sports cars having relatively stiff suspension characteristics, the ability to provide such a runflat tire was comparatively easy as compared to providing such tires for luxury sedans that demand softer ride characteristics. Light truck and sport utility vehicles, although not as sensitive to ride performance, typically utilize tires having a relatively high aspect ratio which makes the requirements for the runflat tire more challenging.

In the case of runflat tires made utilizing stiff inserts, the insert carries most of the load on the tire during periods of operation after loss of air pressure. This leads to the generation of heat. Heat build-up can then lead to thermal degradation in the insert. A reduction in crosslink density and a change in the distribution of crosslink types is the result of this thermal degradation. Thermal degradation can accordingly lead to failure of the insert. This failure limits the range over which the runflat tire can be used during periods of operation after air loss.

SUMMARY OF THE INVENTION

The present invention is directed to a pneumatic runflat tire comprising at least one sidewall insert, the at least one sidewall insert comprising a heterogenous rubber compound comprising first rubber and second rubber composition phases, wherein the second rubber phase is further vulcanizable.

DETAILED DESCRIPTION OF THE INVENTION

Figure 1:
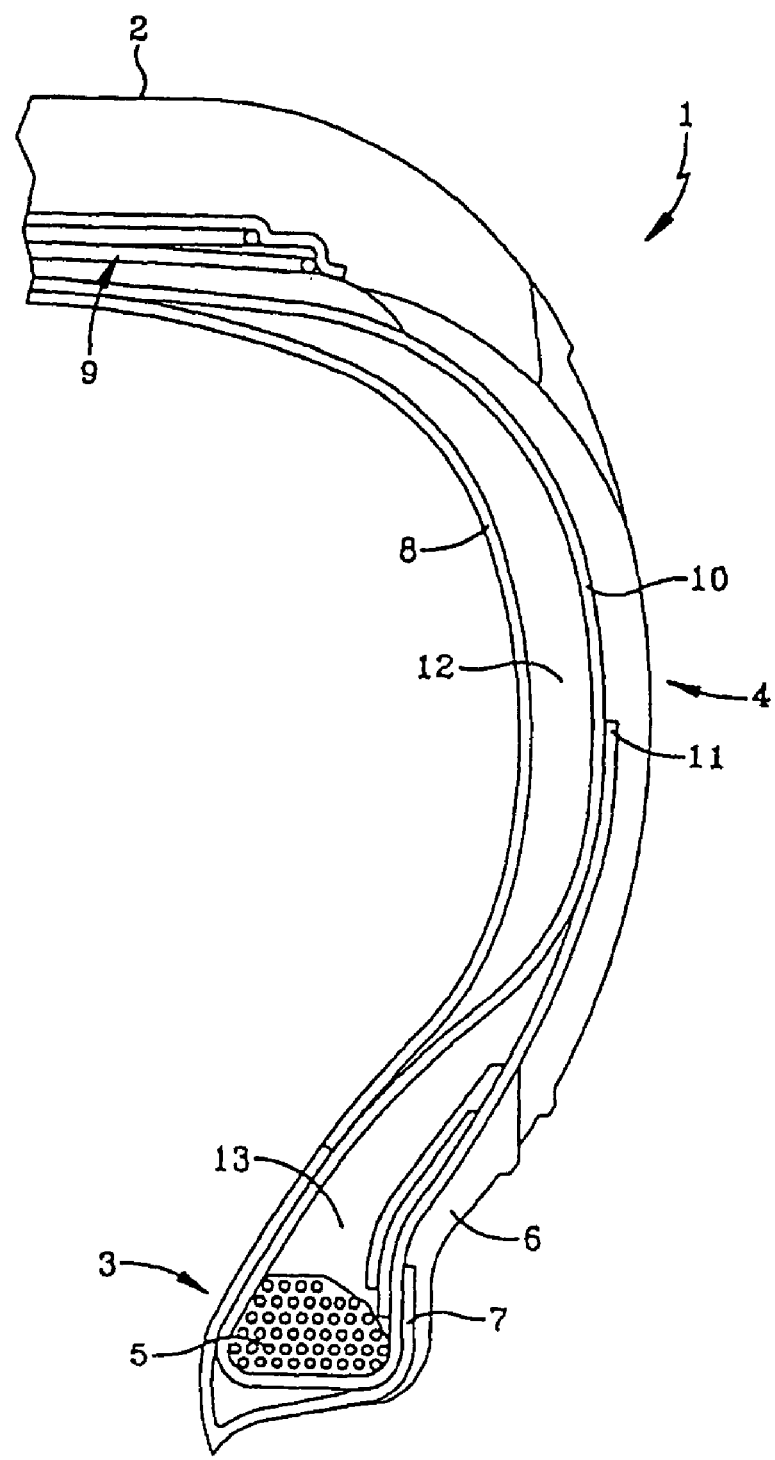
FIG. 1 is a fragmentary cross-sectional view of a tire showing its tread and carcass with one ply and one insert axially inward of the ply in the sidewall region of the tire as an embodiment of the invention.

There is disclosed a pneumatic runflat tire comprising at least one sidewall insert, the at least one sidewall insert comprising a heterogenous rubber compound comprising first rubber and second rubber composition phases, wherein the second rubber phase is further vulcanizable.

In one embodiment, the vulcanization state of the first rubber composition phase is at least at its $T_{80}$ vulcanization state, and the vulcanization state of the second rubber composition phase is between its $T_{25}$ and $T_{80}$ vulcanization states.

In one embodiment, the second rubber composition has a first modulus and a second modulus, the first modulus existing after the normal cure cycle of the tire, and the second modulus obtainable during a runflat condition of the tire, wherein the second modulus is greater than the first modulus.

In one embodiment, the heterogenous rubber compound comprises a first rubber phase and a second rubber phase, wherein the second rubber phase comprises a vulcanization modifier.

Heterogeneous as used herein means containing dissimilar ingredients and/or levels of ingredients. More specifically, the term means a rubber compound containing the selective dispersion of a vulcanization modifier in a first rubber phase and none or a less amount of the vulcanization modifier in a second rubber phase. By vulcanization modifier, it is meant that the presence of the vulcanization modifier result in the vulcanization of the first rubber phase being significantly delayed relative to the vulcanization of the second phase, such that the first phase exhibits a relatively lower modulus that the second phase during normal use, and the rubber composition of the first phase may experience further curing upon experience of a deflation event. Therefore, upon the subsequent mixing of the first and second rubber compositions to obtain the heterogenous rubber compound, there is a higher concentration of the vulcanization modifier in one phase, resulting in a sidewall insert in a run flat tire affording a more comfortable ride during use and longer runflat performance during a deflation event.

The spatial distribution of the first and second rubber compositions as phases relative to each other in the heterogeneous rubber compound depends at least in part on the degree of mixing used to obtain the heterogeneous rubber compound, as well as the mutual viscoelastic compatibility of the first and second rubber compositions. By degree of mixing, it is meant the characteristics of the mixing process used to obtain the heterogeneous rubber compound, including but not limited to the type of mixing (Banbury, extrusion, etc.), order of addition of the first and second rubber compositions, the time duration of mixing, and the temperature of mixing. By viscoelastic incompatibility or viscoelastically incompatible, it is meant that when measuring the temperature dependency of the viscoelasticity of a rubber blend of two rubbers, two distinct tan delta peaks are observed and are due to the individual starting rubbers. By contrast, for viscoelastically compatible rubbers the tan delta versus temperature measurement results in a single tan delta peak. The presence of two phases in the heterogeneous rubber compound is therefore the result of either or both of thermodynamic incompatibility of the respective phases and incomplete mixing of the respective phases.

In one embodiment, the heterogeneous rubber composition may comprise first and second rubber composition phases distributed in a striated fashion. By striated, it is meant that while the first and second rubber composition phases are readily distinguishable, neither of the first or second rubber phase may be clearly identified as a "continuous" phase or as a "disperse" phase. In another embodiment, the heterogenous rubber composition may comprise first and second rubber composition phases distributed such that one rubber composition exists as a continuous phase, and the other rubber composition exists as a disperse phase. By "disperse" phase, it is meant that the designated rubber composition is disposed as a plurality of individual regions not in contact with each other, and each surrounded by the other rubber composition as the "continuous" phase. In another embodiment, the heterogenous rubber composition may exist as a hybrid of regions of continuous and diperse phase, and regions of striated phases.

The heterogenous rubber compound may comprise a range of weight ratios of the first rubber composition phase to the second rubber composition phase. In one embodiment, the weight ratio of the first rubber composition phase to the second rubber composition phase ranges from 4:1 to 1:1. In another embodiment, the weight ratio of the first rubber composition phase to the second rubber composition phase ranges from 3:1 to 1:1.

In one embodiment, the elastomers in the first rubber composition and the second rubber composition are different, that is, they are not identical. Even though the two rubbers are different, each of the two rubbers may be selected from the same group of rubbers. The first rubber and second rubber may be selected from the group consisting of emulsion polymerized styrene/butadiene copolymers, solution polymerized styrene/butadiene copolymers, natural rubber, cis 1,4-polybutadiene, synthetic cis 1,4-polyisoprene, styrene/isoprene copolymers, 3,4-polyisoprene, isoprene/butadiene copolymers, medium vinyl polybutadiene (20 percent to 60 percent by weight of vinyl units), styrene/isoprene/butadiene terpolymers, butyl rubber, polychloroprene, acrylonitrile/butadiene copolymers and ethylene/propylene/diene terpolymers and mixtures thereof.

In one embodiment, the first rubber (used to make the first rubber composition) and the second rubber (used to make the second rubber composition) have different glass transition temperatures (Tg). The term "Tg" refers to the glass transition temperature of the identified rubber and is suitably determined by a differential scanning calorimeter at a rate of 10° C. per minute. In a particularly preferred embodiment, the Tg of the first rubber is higher than the Tg of the second rubber. For example, the Tg of the first rubber may range from −50° C. to 0° C. (high Tg rubber) and the Tg of the second rubber may range from −100° C. to −51° C. (low Tg rubber). In accordance with this embodiment, the difference between the Tg of the first and second rubber generally ranges from about 60° C. to 0° C.

Representative examples of high Tg rubbers include 3,4 polyisoprene which typically contains about 65 weight percent 3,4-isoprene units and has a Tg of about −16° C. Another example of a high Tg rubber is a solution-polymerized styrene/butadiene copolymer rubber containing 12 weight percent styrene, a vinyl content of about 40 weight percent, a Tg of −45° C. and a Mooney viscosity (ML 1+4) at 100° C. of 90. Another high Tg rubber is a styrene/isoprene/butadiene terpolymer rubber containing 20 weight percent styrene, 40 weight percent isoprene and 40 percent butadiene, a Tg of −42° C. and a Mooney viscosity at 100° C. of 90. Yet another high Tg rubber is a high cis 1,4-polybutadiene rubber characterized by the weight percent of 1,4-bonds of at least 9 percent. Another high Tg rubber is a solution-polymerized medium cis 1,4-polybutadiene 40 to 60 weight percent of the units of a vinyl 1,2-structure and 35 to 45 weight percent of its units of a cis 1,4-structure. Such solution-polymerized polybutadiene has a Tg of −65° C. and Mooney viscosity (ML 1+4) at 100° C. of about 44. Additional examples of high Tg rubbers are emulsion-polymerized styrene/butadiene copolymer rubber characterized by a weight percent of from 23.5 to 40 weight percent styrene. For example, an emulsion-polymerized styrene/butadiene copolymer rubber having 23.5 weight percent styrene typically has a Tg of about −55° C. An emulsion-polymerized styrene/butadiene copolymer rubber having 40 weight percent styrene typically has a Tg of about −32° C. to −35° C. The preferred high Tg rubber will depend on the application of the rubber compound of the present invention.

Representative examples of the low Tg rubber include polybutadiene rubber having 95 weight percent or more cis 1,4-structure, a Tg of from −95° C. to −105° C. and a Mooney viscosity (ML 1+4) at 100° C. of from 30 to 100. Another example of a low Tg rubber is an isoprene/butadiene copolymer rubber prepared by neodymium catalysis and characterized by having an isoprene content of about 20 weight percent, a Tg of about −90° C. and a Mooney viscosity (ML 1+4) at 100° C. of 82. Yet another example is an isoprene/butadiene copolymer rubber prepared by neodymium catalysis and characterized by having an isoprene content of about 10 weight percent, a Tg of about −98° C. and a Mooney viscosity (ML 1+4) at 100° C. of 82. Other examples of suitable rubbers are solution-polymerized styrene/butadiene copolymer rubbers containing up to 10 weight percent of styrene. Such styrene/butadiene copolymers exhibit a Tg of from −93° C. to −80° C. and Mooney viscosities (ML 1+4) at 100° C. from 30 to 100. The preferred low Tg rubber will depend on the application of the rubber compound of the present invention.

Another example is cis 1,4-polyisoprene. The cis 1,4-polyisoprene rubber includes both natural and synthetic rubbers. The cis 1,4-polyisoprene rubber, natural or synthetic, typically has a cis 1,4-content of about 96 to about 99 weight percent. Synthetic cis 1,4-polyisoprene generally has a Tg of about −65° C. Natural rubber typically has a Tg of about −65° C. Typical Mooney viscosities (ML 1+4) at 100° C. for synthesis cis 1,4-polyisoprene and natural rubber range from 30 to 100. Another low Tg rubber is an isoprene/butadiene copolymer rubber prepared by neodymium catalysis characterized by an isoprene content of about 70 weight percent, a Tg of about −79° C. and a Mooney viscosity (ML 1+4) at 100° C. of 76. Another low Tg rubber is solution-polymerized styrene/butadiene copolymer rubber having a styrene content of about 18 weight percent, a vinyl content of about 10 weight percent, a Tg of about −78° C. and a Mooney viscosity (ML 1+4) at 100° C. of 85.

In addition to the first rubber in the first rubber composition, another rubber may also be present. In those instances where two or more rubbers are used in the first rubber composition, the first rubber should be used in an amount ranging from about 30 to 80 parts by weight per 100 parts by weight of the total rubber (phr), based on the first rubber composition. Preferably, the first rubber should be present in the first rubber composition in an amount ranging from about 40 to 60 phr.

In those instances where another rubber or rubbers are used in the first rubber composition, it is preferred to observe the same guidelines as to selection of the first rubber; namely, with respect to the described Tg guidelines.

Similarly, the second rubber in the second rubber composition, another rubber may also be present. In those instances where two or more rubbers are used in the second rubber composition, the second rubber should be used in an amount ranging from about 20 to 70 parts by weight per 100 parts by weight of total rubber (phr), based on the second rubber composition. Preferably, the second rubber should be present in the second nonproductive in an amount ranging from about 40 to 60 phr.

In those instances where another rubber or rubbers are used in the second nonproductive, it is preferred to observe the same guidelines as to selection of the second rubber; namely, with respect to the described Tg guidelines.

In one embodiment, to obtain a second rubber composition phase wherein the second rubber composition is further vulcanizable, at least one vulcanization modifier may be added to the second rubber composition. By "vulcanization modifier," it is meant that such a vulcanization modifier will have the effect of affecting the vulcanization of the second rubber phase during the normal cure cycle of the runflat tire, such that the vulcanization state in the second rubber phase is less than its fully cured vulcanization state after the normal cure cycle. The second rubber phase is capable of further cure to a more fully cured vulcanization state upon experience of a higher temperature environment, such as a tire deflation during a runflat event.

A cured rubber composition, for the purposes of the discussion for this invention, is a sulfur cured rubber composition, conventionally a sulfur cured diene-based rubber, which has been cured to a substantial inflection of its modulus (y axis) versus time (x axis) curve. Depending on the method used to measure the cure kinetics, a property related to modulus, such as torque, may be used. In particular, such curve conventionally is a curve with a positive slope which rises over time until it experiences a substantial inflection in a manner that its slope reaches a plateau where it becomes substantially horizontal. In such region of a slope transition, which is somewhat of a maximization of the slope, although the slope might still very gradually rise, it is considered that the rubber composition is fully cured. In the presence of a vulcanization modifier, the shape of the curve may be somewhat modified, depending on the modifier used. The net effect of the vulcanization modifier is to modify the vulcanization of the second rubber composition such that the second rubber composition phase exists in a first vulcanization state after the normal cure cycle for the runflat tire, and the second rubber composition phase may obtain a second vulcanization state upon experience of a higher temperature environment, such as a tire deflation during a runflat event.

In one embodiment, the vulcanization state of the second rubber composition phase is between its $T_{20}$ and $T_{80}$ vulcanization states after the normal cure cycle. In another embodiment, the vulcanization state of the second rubber composition phase is between its $T_{40}$ and $T_{60}$ vulcanization states after the normal cure cycle. The second rubber composition is further vulcanizable and may obtain a second vulcanization state upon experience of a higher temperature environment, such as a tire deflation during a runflat event. The "T-points" (ie, $T_{90}$, $T_{25}$, $T_{80}$, etc.) represent vulcanization states, are recognizable to one skilled in the art and are defined in ASTM D2084, D5289 and ISO 6502 and are fully described in a presentation given by H. G. Buhrin at Tyretech '90 in Brighton, England, Nov. 5-6 1990. The T-points may be determined using the Flexsys Rubber Process Analyzer (RPA) 2000. A description of the RPA 2000, its capability, sample preparation, tests and subtests can be found in these references. H A Pawlowski and J S Dick, Rubber World, June 1992; J S Dick and H A Pawlowski, Rubber World, January 1997; and J S Dick and J A Pawlowski, Rubber & Plastics News, Apr. 26 and May 10, 1993.

In one embodiment, the vulcanization state of the first rubber composition phase may be at least at its $T_{90}$ vulcanization state after the normal cure cycle.

By allowing the second rubber composition phase of the insert to be in less than its fully cured vulcanization state after the normal cure cycle for the runflat tire, it is comtemplated that upon experience a deflation event, the heat generated during the event will cause the second rubber composition to further cure and delay the onset of degradation of the insert. The driver thereby gains precious time to slow and stop before degradation of the insert. The less than fully cure second rubber composition phase also imparts a degree of softness to the insert, which affords a more comfortable ride on the runflat tires during normal use.

In one embodiment, the vulcanization modifier for use in the second rubber composition include $\alpha,\omega$-bis(N,N'-dihydrocarbylthiocarbamamoyldithio)alkanes, bismaleimides, and biscitraconimides.

In one embodiment, the vulcanization modifier is a $\alpha,\omega$-bis(N,N'-dihydrocarbylthiocarbamamoyldithio)alkanes. Suitable $\alpha,\omega$-bis(N,N'-dihydrocarbylthiocarbamamoyldithio)alkanes include 1,2-bis(N,N'-dibenzylthiocarbamoyl-dithio)ethane; 1,3-bis(N,N'-dibenzylthiocarbamoyldithio)propane; 1,4-bis(N,N'-dibenzylthiocarbamoyldithio)butane; 1,5-bis(N,N'-dibenzylthiocarbamoyl-dithio)pentane; 1,6-bis(N,N'-dibenzylthiocarbamoyldithio)hexane; 1,7-bis(N,N'-dibenzylth-iocarbamoyldithio)heptane; 1,8-bis(N,N'-dibenzylthiocarbamoyl-dithio)octane; 1,9-bis(N,N'-dibenzylthiocarbamoyldithio)nonane; and 1,10-bis(N,N'-dibenzylthiocarbamoyldithio)decane. In one embodiment, the vulcanization modifier is 1,6-bis(N,N'-dibenzylthiocarbamoyldithio)hexane available as Vulcuren® from Bayer.

In one embodiment, the vulcanization modifier is a bismaleimide. Suitable bismaleimides include N,N'-m-phenylene bismaleimide, available as HVA-2 from DuPont.

In one embodiment, the vulcanization modifier is a citraconimide. Suitable citraconimidies include N,N'-m-xylylene biscitraconimide, also known as 1,3-bis(citraconimidomethyl)benzene, available as Perkalink® 900 from Flexsys.

In one embodiment, the vulcanization modifier includes nitroso compounds, phthalimides, anhydrides and acids. In one embodiment, the vulcanization inhibitor includes N-nitroso diphenylamine, polynitroso-2,2,4-trimethyl-1,2-dihydroquinoline, N-cyclohexyl thiophthalimide, phthalic anhydride, salicylic acid, and benzoic acid.

In one embodiment, the second rubber composition may comprise from about 1 to about 10 parts by weight, per 100 parts by weight of elastomer (phr), of the vulcanization modifier. In another embodiment, the second rubber composition may comprise from about 2 to about 8 phr of vulcanization modifier.

The present invention may be used with rubbers or elastomers containing olefinic unsaturation. The phrase "rubber or elastomer containing olefinic unsaturation" is intended to include both natural rubber and its various raw and reclaim forms as well as various synthetic rubbers. In the description of this invention, the terms "rubber" and "elastomer" may be used interchangeably, unless otherwise prescribed. The terms "rubber composition", "compounded rubber" and "rubber compound" are used interchangeably to refer to rubber which has been blended or mixed with various ingredients and materials and such terms are well known to those having skill in the rubber mixing or rubber compounding art. Representative synthetic polymers are the homopolymerization products of butadiene and its homologues and derivatives, for example, methylbutadiene, dimethylbutadiene and pentadiene as well as copolymers such as those formed from butadiene or its homologues or derivatives with other unsaturated monomers. Among the latter are acetylenes, for example, vinyl acetylene; olefins, for example, isobutylene, which copolymerizes with isoprene to form butyl rubber; vinyl compounds, for example, acrylic acid, acrylonitrile (which polymerize with butadiene to form NBR), methacrylic acid and styrene, the latter compound polymerizing with butadiene to form SBR, as well as vinyl esters and various unsaturated aldehydes, ketones and ethers, e.g., acrolein, methyl isopropenyl ketone and vinylethyl ether. Specific examples of synthetic rubbers include neoprene (polychloroprene), polybutadiene (including cis-1, 4-polybutadiene), polyisoprene (including cis-1,4-polyisoprene), butyl rubber, halobutyl rubber such as chlorobutyl rubber or bromobutyl rubber, styrene/isoprene/butadiene rubber, copolymers of 1,3-butadiene or isoprene with monomers such as styrene, acrylonitrile and methyl methacrylate, as well as ethylene/propylene terpolymers, also known as ethylene/propylene/diene monomer (EPDM), and in particular, ethylene/propylene/dicyclopentadiene terpolymers. Additional examples of rubbers which may be used include alkoxy-silyl end functionalized solution polymerized polymers (SBR, PBR, IBR and SIBR), silicon-coupled and tin-coupled star-branched polymers. The preferred rubber or elastomers are polybutadiene and SBR.

In one aspect the rubber is preferably of at least two of diene based rubbers. For example, a combination of two or more rubbers is preferred such as cis 1,4-polyisoprene rubber (natural or synthetic, although natural is preferred), 3,4-polyisoprene rubber, styrene/isoprene/butadiene rubber, emulsion and solution polymerization derived styrene/butadiene rubbers, cis 1,4-polybutadiene rubbers and emulsion polymerization prepared butadiene/acrylonitrile copolymers.

In one aspect of this invention, an emulsion polymerization derived styrene/butadiene (E-SBR) might be used having a relatively conventional styrene content of about 20 to about 28 percent bound styrene or, for some applications, an E-SBR having a medium to relatively high bound styrene content, namely, a bound styrene content of about 30 to about 45 percent.

By emulsion polymerization prepared E-SBR, it is meant that styrene and 1,3-butadiene are copolymerized as an aqueous emulsion. Such are well known to those skilled in such art. The bound styrene content can vary, for example, from about 5 to about 50 percent. In one aspect, the E-SBR may also contain acrylonitrile to form a terpolymer rubber, as E-SBAR, in amounts, for example, of about 2 to about 30 weight percent bound acrylonitrile in the terpolymer.

Emulsion polymerization prepared styrene/butadiene/acrylonitrile copolymer rubbers containing about 2 to about 40 weight percent bound acrylonitrile in the copolymer are also contemplated as diene based rubbers for use in this invention.

The solution polymerization prepared SBR (S-SBR) typically has a bound styrene content in a range of about 5 to about 50, preferably about 9 to about 36, percent. The S-SBR can be conveniently prepared, for example, by organo lithium catalyzation in the presence of an organic hydrocarbon solvent.

In one embodiment, c is 1,4-polybutadiene rubber (BR) may be used. Such BR can be prepared, for example, by organic solution polymerization of 1,3-butadiene. The BR may be conveniently characterized, for example, by having at least a 90 percent cis 1,4-content.

The cis 1,4-polyisoprene and cis 1,4-polyisoprene natural rubber are well known to those having skill in the rubber art.

The term "phr" as used herein, and according to conventional practice, refers to "parts by weight of a respective material per 100 parts by weight of rubber, or elastomer."

The rubber composition may also include up to 70 phr of processing oil. Processing oil may be included in the rubber composition as extending oil typically used to extend elastomers. Processing oil may also be included in the rubber composition by addition of the oil directly during rubber compounding. The processing oil used may include both extending oil present in the elastomers, and process oil added during compounding. Suitable process oils include various oils as are known in the art, including aromatic, paraffinic, napthenic, vegetable oils, and low PCA oils, such as MES, TDAE, SRAE and heavy naphthenic oils.

The phrase "rubber or elastomer containing olefinic unsaturation" is intended to include both natural rubber and its various raw and reclaim forms as well as various synthetic rubbers. In the description of this invention, the terms "rubber" and "elastomer" may be used interchangeably, unless otherwise prescribed. The terms "rubber composition," "compounded rubber" and "rubber compound" are used interchangeably to refer to rubber which has been blended or mixed with various ingredients and materials, and such terms are well known to those having skill in the rubber mixing or rubber compounding art.

The vulcanizable rubber composition may include from about 10 to about 150 phr of silica.

The commonly employed siliceous pigments which may be used in the rubber compound include conventional pyrogenic and precipitated siliceous pigments (silica). In one embodiment, precipitated silica is used. The conventional siliceous pigments employed in this invention are precipitated silicas such as, for example, those obtained by the acidification of a soluble silicate, e.g., sodium silicate.

Such conventional silicas might be characterized, for example, by having a BET surface area, as measured using nitrogen gas. In one embodiment, the BET surface area may be in the range of about 40 to about 600 square meters per gram. In another embodiment, the BET surface area may be in a range of about 80 to about 300 square meters per gram. The BET method of measuring surface area is described in the *Journal of the American Chemical Society*, Volume 60, Page 304 (1930).

The conventional silica may also be characterized by having a dibutylphthalate (DBP) absorption value in a range of about 100 to about 400, alternatively about 150 to about 300.

The conventional silica might be expected to have an average ultimate particle size, for example, in the range of 0.01 to 0.05 micron as determined by the electron microscope, although the silica particles may be even smaller, or possibly larger, in size.

Various commercially available silicas may be used, such as, only for example herein, and without limitation, silicas commercially available from PPG Industries under the Hi-Sil trademark with designations 210, 243, etc; silicas available from Rhodia, with, for example, designations of Z1165 MP and Z165GR and silicas available from Degussa AG with, for example, designations VN2 and VN3, etc.

The vulcanizable rubber composition may include from 1 to 100 phr of carbon black, crosslinked particulate polymer gel, ultra high molecular weight polyethylene (UHMWPE) or plasticized starch.

Commonly employed carbon blacks can be used as a conventional filler. Representative examples of such carbon blacks include N110, N121, N134, N220, N231, N234, N242, N293, N299, N315, N326, N330, N332, N339, N343, N347, N351, N358, N375, N539, N550, N582, N630, N642, N650, N683, N754, N762, N765, N774, N787, N907, N908, N990 and N991. These carbon blacks have iodine absorptions ranging from 9 to 145 g/kg and DBP number ranging from 34 to 150 cm$^3$/100 g.

Other fillers may be used in the rubber composition including, but not limited to, particulate fillers including ultra high molecular weight polyethylene (UHMWPE), particulate polymer gels including but not limited to those disclosed in U.S. Pat. Nos. 6,242,534; 6,207,757; 6,133,364; 6,372,857; 5,395,891; or 6,127,488, and plasticized starch composite filler including but not limited to that disclosed in U.S. Pat. No. 5,672,639.

In one embodiment the rubber composition for use in the tire tread may contain a conventional sulfur containing organosilicon compound. Examples of suitable sulfur containing organosilicon compounds are of the formula:

$$Z-Alk-S_n-Alk-Z \qquad \text{II}$$

in which Z is selected from the group consisting of

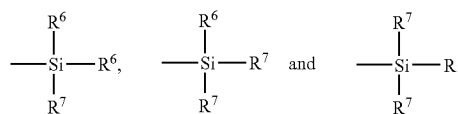

where $R^6$ is an alkyl group of 1 to 4 carbon atoms, cyclohexyl or phenyl; $R^7$ is alkoxy of 1 to 8 carbon atoms, or cycloalkoxy of 5 to 8 carbon atoms; Alk is a divalent hydrocarbon of 1 to 18 carbon atoms and n is an integer of 2 to 8.

Specific examples of sulfur containing organosilicon compounds which may be used in accordance with the present invention include: 3,3'-bis(trimethoxysilylpropyl) disulfide, 3,3'-bis(triethoxysilylpropyl) disulfide, 3,3'-bis(triethoxysilylpropyl) tetrasulfide, 3,3'-bis(triethoxysilylpropyl) octasulfide, 3,3'-bis(trimethoxysilylpropyl) tetrasulfide, 2,2'-bis(triethoxysilylethyl) tetrasulfide, 3,3'-bis(trimethoxysilylpropyl) trisulfide, 3,3'-bis(triethoxysilylpropyl) trisulfide, 3,3'-bis(tributoxysilylpropyl) disulfide, 3,3'-bis(trimethoxysilylpropyl) hexasulfide, 3,3'-bis(trimethoxysilylpropyl) octasulfide, 3,3'-bis(trioctoxysilylpropyl) tetrasulfide, 3,3'-bis(trihexoxysilylpropyl) disulfide, 3,3'-bis(tri-2"-ethylhexoxysilylpropyl) trisulfide, 3,3'-bis(triisooctoxysilylpropyl) tetrasulfide, 3,3'-bis(tri-t-butoxysilylpropyl) disulfide, 2,2'-bis(methoxy diethoxy silyl ethyl) tetrasulfide, 2,2'-bis(tripropoxysilylethyl) pentasulfide, 3,3'-bis(tricyclonexoxysilylpropyl) tetrasulfide, 3,3'-bis(tricyclopentoxysilylpropyl) trisulfide, 2,2'-bis(tri-2"-methylcyclohexoxysilylethyl) tetrasulfide, bis(trimethoxysilylmethyl) tetrasulfide, 3-methoxy ethoxy propoxysilyl 3'-diethoxybutoxy-silylpropyltetrasulfide, 2,2'-bis(dimethyl methoxysilylethyl) disulfide, 2,2'-bis(dimethyl sec.butoxysilylethyl) trisulfide, 3,3'-bis(methyl butylethoxysilylpropyl) tetrasulfide, 3,3'-bis(di t-butylmethoxysilylpropyl) tetrasulfide, 2,2'-bis(phenyl methyl methoxysilylethyl) trisulfide, 3,3'-bis(diphenyl isopropoxysilylpropyl) tetrasulfide, 3,3'-bis(diphenyl cyclohexoxysilylpropyl) disulfide, 3,3'-bis(dimethyl ethylmercaptosilylpropyl) tetrasulfide, 2,2'-bis(methyl dimethoxysilylethyl) trisulfide, 2,2'-bis(methyl ethoxypropoxysilylethyl) tetrasulfide, 3,3'-bis(diethyl methoxysilylpropyl) tetrasulfide, 3,3'-bis(ethyl di-sec. butoxysilylpropyl)disulfide, 3,3'-bis(propyl diethoxysilylpropyl) disulfide, 3,3'-bis(butyl dimethoxysilylpropyl) trisulfide, 3,3'-bis(phenyl dimethoxysilylpropyl) tetrasulfide, 3-phenyl ethoxybutoxysilyl 3'-trimethoxysilylpropyl tetrasulfide, 4,4'-bis(trimethoxysilylbutyl) tetrasulfide, 6,6'-bis(triethoxysilylhexyl) tetrasulfide, 12,12'-bis(triisopropoxysilyl dodecyl) disulfide, 18,18'-bis(trimethoxysilyloctadecyl) tetrasulfide, 18,18'-bis(tripropoxysilyloctadecenyl) tetrasulfide, 4,4'-bis(trimethoxysilyl-buten-2-yl) tetrasulfide, 4,4'-bis(trimethoxysilylcyclohexylene) tetrasulfide, 5,5'-bis(dimethoxymethylsilylpentyl) trisulfide, 3,3'-bis(trimethoxysilyl-2-methylpropyl) tetrasulfide, 3,3'-bis(dimethoxyphenylsilyl-2-methylpropyl) disulfide.

In one embodiment, the sulfur containing organosilicon compounds are the 3,3'-bis(trimethoxy or triethoxy silylpropyl) sulfides. In one embodiment, the sulfur containing organosilicon compounds are 3,3'-bis(triethoxysilylpropyl) disulfide and 3,3'-bis(triethoxysilylpropyl) tetrasulfide. Therefore, as to formula II, Z may be

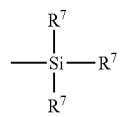

where $R^7$ is an alkoxy of 2 to 4 carbon atoms, alternatively 2 carbon atoms; alk is a divalent hydrocarbon of 2 to 4 carbon atoms, alternatively with 3 carbon atoms; and n is an integer of from 2 to 5, alternatively 2 or 4.

In another embodiment, suitable sulfur containing organosilicon compounds include compounds disclosed in U.S. Pat. No. 6,608,125. As disclosed in U.S. Pat. No. 6,608,125, these sulfur containing organosilicon compounds are of the formula G-C(=O)—S—CH$_2$CH$_2$CH$_2$SiX$_3$ wherein each X is an independently selected RO— group wherein each R is independently selected from the group consisting of hydrogen, alkyl that may or may not contain unsaturation, alkenyl groups, aryl groups, and aralkyl groups, such moieties other than hydrogen having from 1 to 18 carbon atoms, and G is a monovalent alkyl of from 6 to 8 carbon atoms. In one embodiment, the sulfur containing organosilicon compounds includes 3-(octanoylthio)-1-propyltriethoxysilane, CH$_3$(CH$_2$)$_6$C(=O)—S—CH$_2$CH$_2$CH$_2$Si(OCH$_2$CH$_3$)$_3$, which is available commercially as NXT™ from GE Silicones.

In another embodiment, suitable sulfur containing organosilicon compounds include those disclosed in U.S. Patent Publication 2003/0130535. As disclosed in U.S. Patent Publication 2003/0130535, these sulfur containing organosilicon compounds are of the formulas III or IV

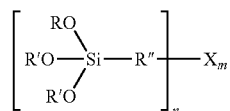

III

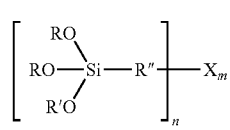

IV wherein: R is a methyl or ethyl group;

R' is identical or different and is a $C_9C_{30}$ branched or unbranched monovalent alkyl or alkenyl group, aryl group, aralkyl group, branched or unbranched $C_2$-$C_{30}$ alkyl ether group, branched or unbranched $C_2$-$C_{30}$ alkyl polyether group or R'''$_3$Si, where R''' is $C_1$-$C_{30}$ branched or unbranched alkyl or alkenyl group, aralkyl group or aryl group, R'' is a branched or unbranched, saturated or unsaturated, aliphatic, aromatic or mixed aliphatic/aromatic divalent $C_1$-$C_{30}$ hydrocarbon group;

X is SH where n=1 and m=1, S where n=2 and m=1-10 and mixtures thereof, S(C=O)—R''' where n=1 and m=1 or H where n=1 and m=1;

R'' may mean $CH_2$, $CH_2CH_2$, $CH_2CH_2CH_2$, $CH_2CH_2CH_2CH_2$, $CH(CH_3)$, $CH_2CH(CH_3)$, $C(CH_3)_2$, $CH(C_2H_5)$, $CH_2CH_2CH(CH_3)$, $CH_2CH(CH_3)CH_2$ or

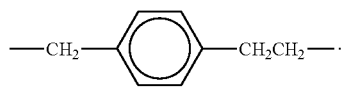

In one embodiment, the sulfur containing organosilicon compound is of formula III, R is ethyl, R' is $C_{12}$-$C_{14}$ alkyl, R'' is $CH_2CH_2CH_2$, X is SH, n is 1 and m is 1. In one embodiment, the sulfur containing organosilicon compound is Si-363 from Degussa.

The amount of the sulfur containing organosilicon compound in a rubber composition will vary depending on the level of other additives that are used. Generally speaking, the amount of the compound will range from 0.5 to 20 phr. In one embodiment, the amount will range from 1 to 10 phr.

It is readily understood by those having skill in the art that the rubber composition would be compounded by methods generally known in the rubber compounding art, such as mixing the various sulfur-vulcanizable constituent rubbers with various commonly used additive materials such as, for example, sulfur donors, curing aids such as activators, and processing additives, such as oils, resins including tackifying resins and plasticizers, fillers, pigments, fatty acid, zinc oxide, waxes, antioxidants and antiozonants and peptizing agents. As known to those skilled in the art, depending on the intended use of the sulfur vulcanizable and sulfur-vulcanized material (rubbers), the additives mentioned above are selected and commonly used in conventional amounts. Representative examples of sulfur donors include elemental sulfur (free sulfur), an amine disulfide, polymeric polysulfide and sulfur olefin adducts. In one embodiment, the sulfur-vulcanizing agent is elemental sulfur. The sulfur-vulcanizing agent may be used in an amount ranging from 0.5 to 8 phr, alternatively with a range of from 1.5 to 6 phr. Typical amounts of tackifier resins, if used, comprise about 0.5 to about 10 phr, usually about 1 to about 5 phr. Typical amounts of processing aids comprise about 1 to about 50 phr. Typical amounts of antioxidants comprise about 1 to about 5 phr. Representative antioxidants may be, for example, diphenyl-p-phenylenediamine and others, such as, for example, those disclosed in *The Vanderbilt Rubber Handbook* (1978), pages 344 through 346. Typical amounts of antiozonants comprise about 1 to 5 phr. Typical amounts of fatty acids, if used, which can include stearic acid comprise about 0.5 to about 3 phr. Typical amounts of zinc oxide comprise about 2 to about 5 phr. Typical amounts of waxes comprise about 1 to about 5 phr. Often microcrystalline waxes are used. Typical amounts of peptizers comprise about 0.1 to about 1 phr. Typical peptizers may be, for example, pentachlorothiophenol and dibenzamidodiphenyl disulfide.

Accelerators are used to control the time and/or temperature required for vulcanization and to improve the properties of the vulcanizate. In one embodiment, a single accelerator system may be used, i.e., primary accelerator. The primary accelerator(s) may be used in total amounts ranging from about 0.5 to about 4, alternatively about 0.8 to about 1.5, phr. In another embodiment, combinations of a primary and a secondary accelerator might be used with the secondary accelerator being used in smaller amounts, such as from about 0.05 to about 3 phr, in order to activate and to improve the properties of the vulcanizate. Combinations of these accelerators might be expected to produce a synergistic effect on the final properties and are somewhat better than those produced by use of either accelerator alone. In addition, delayed action accelerators may be used which are not affected by normal processing temperatures but produce a satisfactory cure at ordinary vulcanization temperatures. Vulcanization retarders might also be used. Suitable types of accelerators that may be used in the present invention are amines, disulfides, guanidines, thioureas, thiazoles, thiurams, sulfenamides, dithiocarbamates and xanthates. In one embodiment, the primary accelerator is a sulfenamide. If a second accelerator is used, the secondary accelerator may be a guanidine, dithiocarbamate or thiuram compound.

The mixing of the rubber composition can be accomplished by methods known to those having skill in the rubber mixing art. For example, the ingredients are typically mixed in at least two stages, namely, at least one non-productive stage followed by a productive mix stage. The final curatives including sulfur-vulcanizing agents are typically mixed in a final stage which is conventionally called a "productive" mix stage in which the mixing typically occurs at a temperature, or ultimate temperature, lower than the mix temperature(s) than the preceding non-productive mix stage(s). The terms "non-productive" and "productive" mix stages are well known to those having skill in the rubber mixing art. The rubber composition may be subjected to a thermomechanical mixing step. A thermomechanical mixing step generally comprises a mechanical working in a mixer or extruder for a period of time suitable in order to produce a rubber temperature between 140° C. and 190° C. The appropriate duration of a thermomechanical working varies as a function of the operating conditions, and the volume and nature of the components. For example, a thermomechanical working may be from 1 to 20 minutes.

In one embodiment, mixing of the heterogeneous rubber compound may be accomplished using a phase mixing procedure as described in U.S. Pat. No. 6,121,367, fully incorporated herein by reference. Such a phase mixing procedure as applied to the present invention involves the use of two separate productive mix stages, one for each of the first and second rubber composition phases. To produce the first rubber composition phase, a first nonproductive mix stage is used to mix the rubber, carbon black and/or silica, and other non-curatives. The first nonproductive mix stage is then followed by a first productive mix stage, wherein the curatives are mixed into the nonproductive mix resulting from the first nonproductive mix stage. Similarly, to produce the second rubber composition phase, a second nonproductive mix stage is used to mix the rubber, carbon black and/or silica, and other noncuratives. The second nonproductive mix stage is then followed by a second productive mix stage, wherein the curatives are mixed into the nonproductive mix resulting from the second nonproductive mix stage. The first and second productive mixes are then mixed to produce the heterogenous rubber compound.

The curatives that are added to make the first and second productive mixes may be the same or different and/or used at different levels. In particular, the amount of vulcanization modifier in the first productive mix is less than the amount of vulcanization modifier in the second productive mix. Preferably, each productive compound has a curative particularly designed for it based on the rubbers used as well as other ingredients present.

The curatives, including sulfur vulcanizing agents and vulcanization modifier, if present, are separately mixed with the first and second nonproductive compounds. Productive mixing typically occurs at a temperature, or ultimate temperature lower than the mix temperature(s) of the preceding nonproductive stage(s) and always below the subsequent cure temperatures. Typical mixing of the productive compound is at a rubber temperature ranging from 90 to 110° C. for a period of 30 seconds to 3 minutes.

After the first and second productive mixes have been prepared, the two productive mixes are mixed together. It is preferred to have as little mixing as possible to maintain the heterogeneous nature of the overall rubber. As can be appreciated, the more mixing the more homogeneous the rubber will be, resulting in each of the productive compounds losing their identity to the other.

The rubber composition may be incorporated in a sidewall insert of the runflat tire.

The pneumatic tire of the present invention may be a race tire, passenger tire, aircraft tire, agricultural, earthmover, off-the-road, truck tire, and the like. In one embodiment, the tire is a passenger or truck tire. The tire may also be a radial or bias.

Vulcanization of the pneumatic tire of the present invention is generally carried out at conventional temperatures ranging from about 100° C. to 200° C. In one embodiment, the vulcanization is conducted at temperatures ranging from about 110° C. to 180° C. Any of the usual vulcanization processes may be used such as heating in a press or mold, heating with superheated steam or hot air. Such tires can be built, shaped, molded and cured by various methods which are known and will be readily apparent to those having skill in such art.

Figure 2:
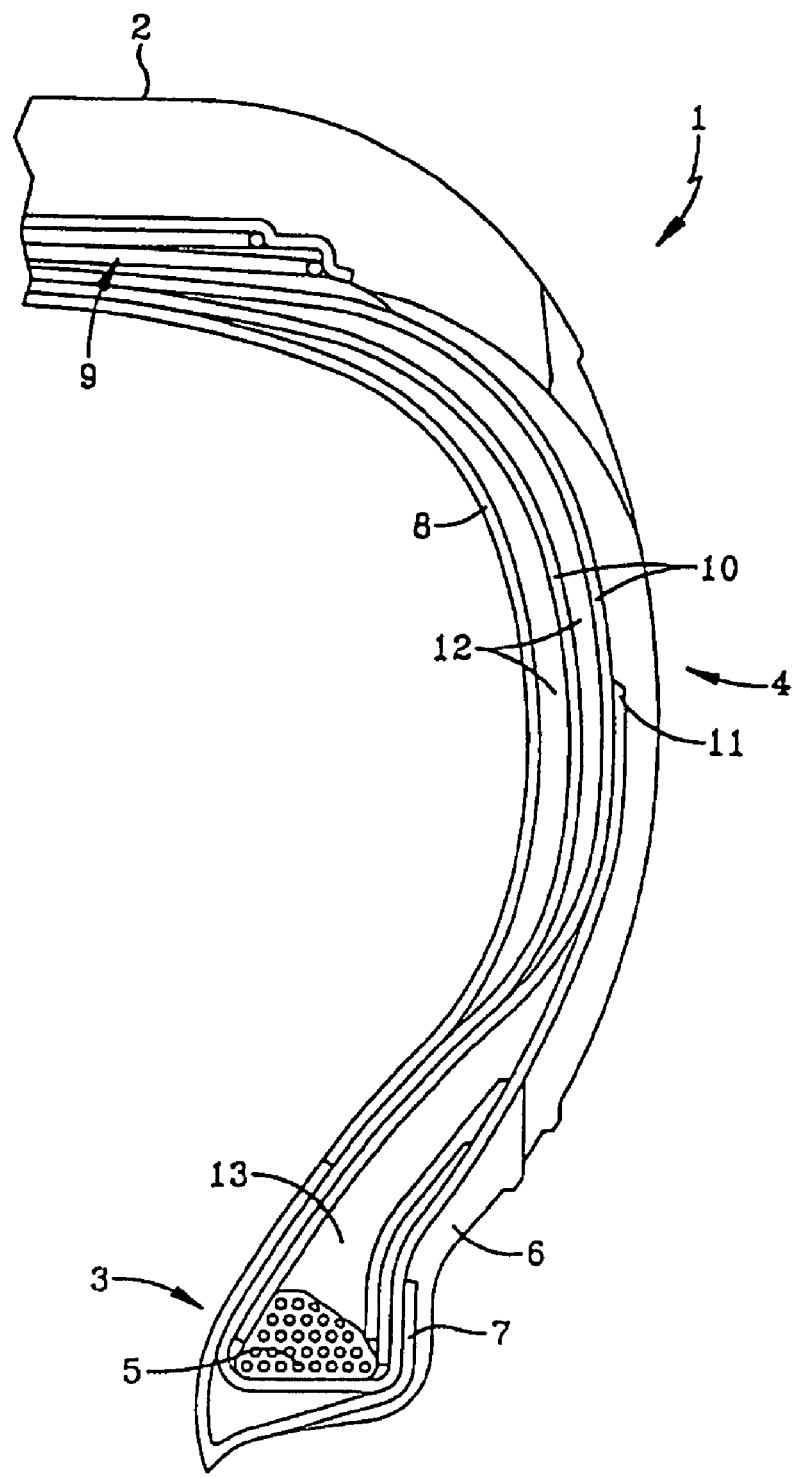
FIG. 2 is a fragmentary cross-sectional view of a tire showing its tread and carcass with two plies, a second insert interposed between the plies and a second ply axially outward of the innermost ply in the sidewall region of the tire as an embodiment of the invention.
Figure 3:
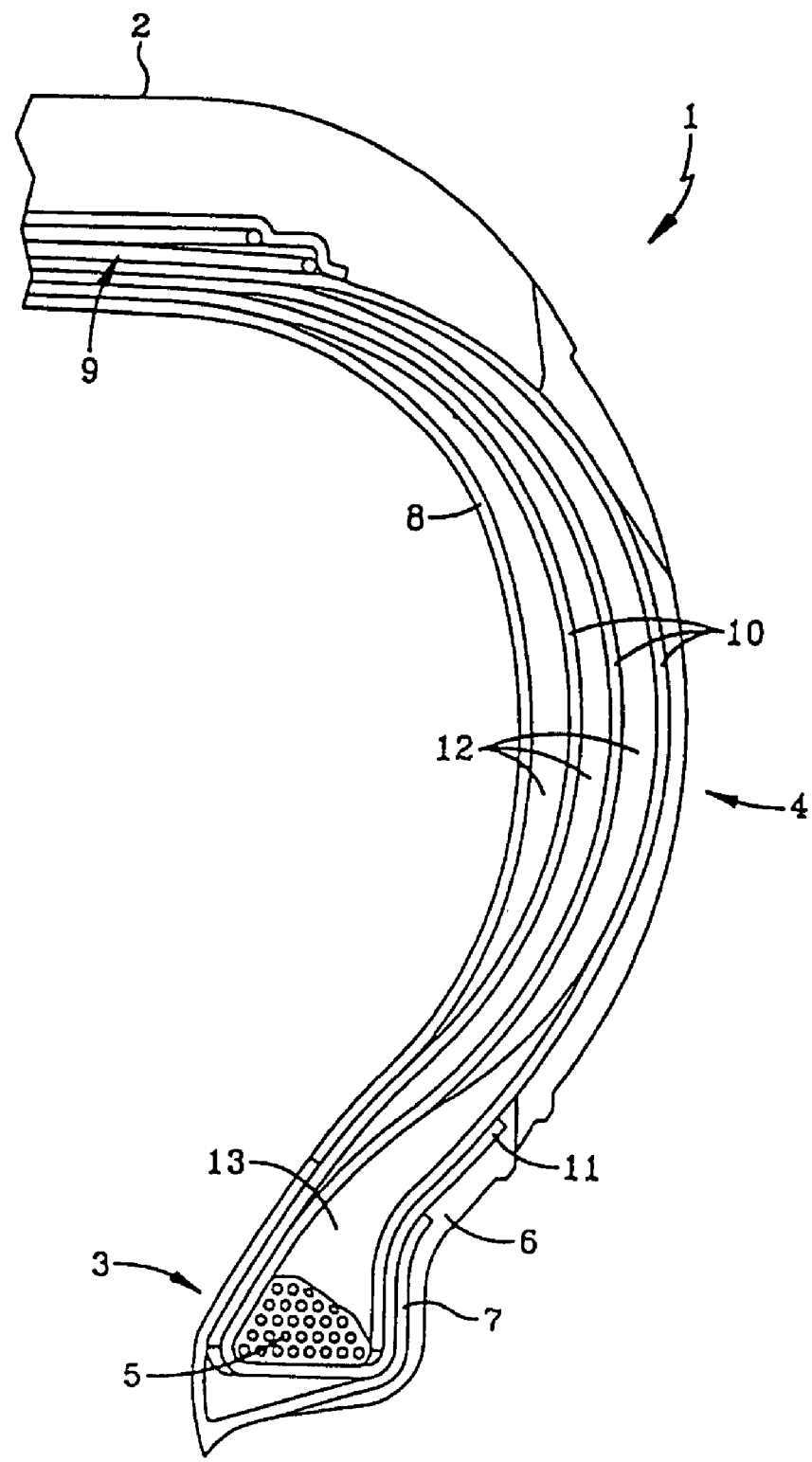
FIG. 3 is a fragmentary cross-sectional view of a tire showing its tread and carcass with three plies, inserts between the plies and another insert axially inward of the innermost ply in the sidewall region of the tire as an embodiment of the invention.

Referring to the drawings, FIGS. 1, 2 and 3 show the fragmentary cross-section of a tire 1, its tread 2, bead portion 3, sidewall or sidewall region 4, inextensible wire bead core 5, rubber chafer 6, rubber toeguard 7, rubber composition innerliner 8, belt structure 9 underlying a portion of the tread 2, carcass ply 10, carcass ply turnup 11, insert 12 and apex 13.

The inserts 12 may extend from each bead region radially to the edge of the tread, usually to just beneath the reinforcing belt structures 9. As illustrated in the Figures, the sidewall portions may each include a first insert 12 and a second insert 12 and even a third insert 12. The first inserts 12 are positioned as described above. The second inserts 12 are located (interposed) between the first and the second plies 10, respectively. The second insert 12 extends from each bead region 3, or portion, radially outward to the edge of the tread 2, namely, to just beneath the reinforcing belt structure 9.

The runflat tire containing the inserts of this invention can be built, shaped, molded and cured by various methods that will be readily apparent to those having skill in the art. In general, the runflat tires of this invention can be manufactured using standard techniques with, of course, the exception that the insert therein contains an antireversion agent in addition to the rubbery polymer.

The invention is further illustrated by the following non-limiting examples.

Example 1

Figure 4:
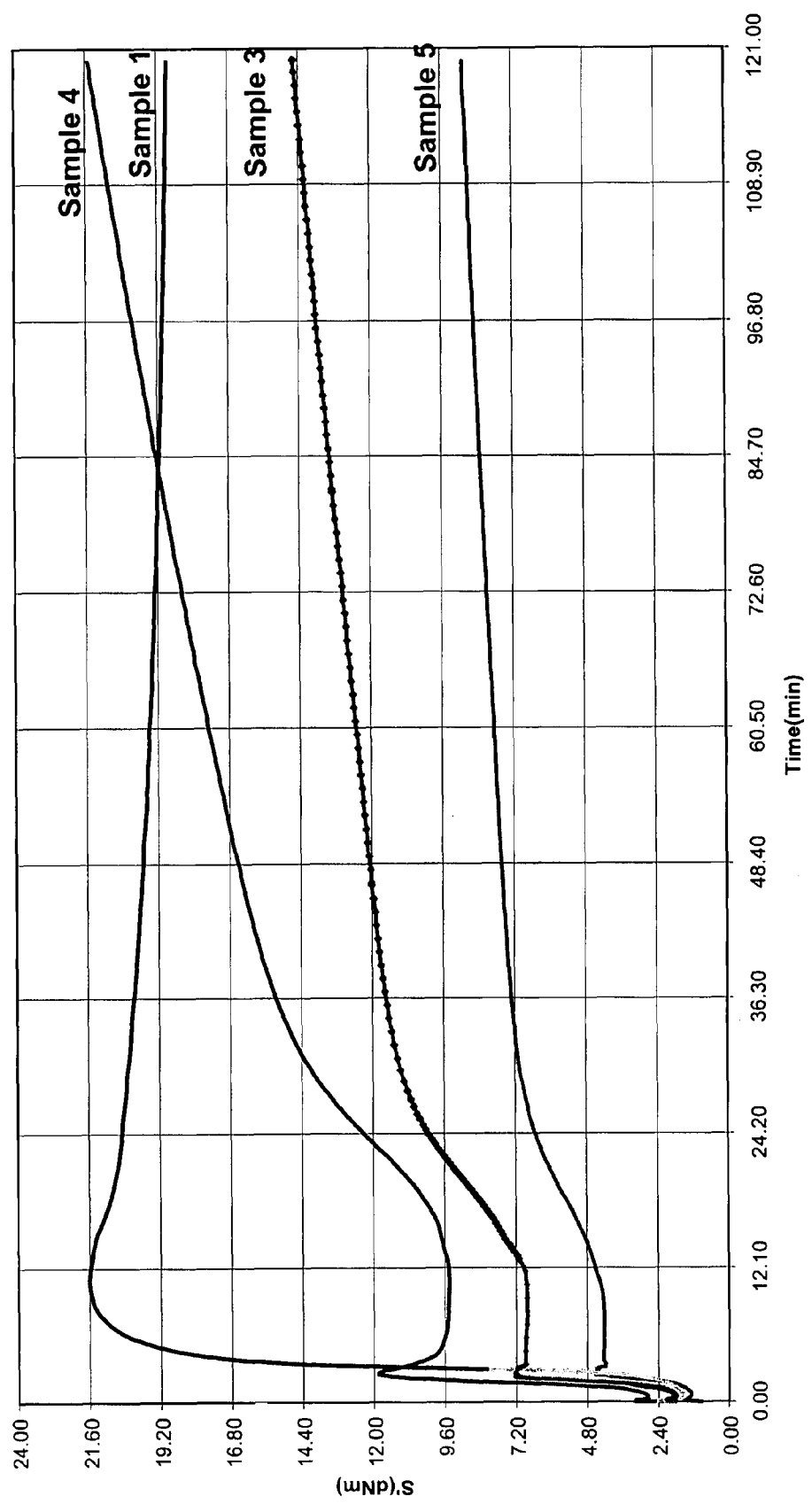
FIG. 4 is a graph of torque versus cure time for several rubber compositions according to the present invention.

In this example, the effect of adding a vulcanization modifier to a rubber composition is illustrated. Five samples were prepared following the recipes in Table 1, with amounts given in phr. Each composition was prepared in a multistage mix procedure with at least one non-productive stage and one productive stage. The samples were then tested for cure kinetics with results as shown in FIG. 4.

TABLE 1

| | Sample | | | | |
|---|---|---|---|---|---|
| | 1 | 2 | 3 | 4 | 5 |
| Natural Rubber | 80 | 100 | 100 | 100 | 100 |
| Polybutadiene[1] | 20 | 0 | 0 | 0 | 0 |
| Carbon Black | 30 | 32 | 32 | 50 | 10 |
| Silica | 15 | 0 | 0 | 0 | 0 |
| Coupling Agent[2] | 5 | 0 | 0 | 0 | 0 |
| Antidegradants[3] | 3.25 | 3 | 3 | 3 | 3 |
| Zinc Oxide | 5 | 2.5 | 2.5 | 2.5 | 2.5 |
| Stearic Acid | 1 | 1 | 1 | 1 | 1 |
| Sulfur | 3 | 2 | 2 | 2 | 2 |
| Accelerators[4] | 4.75 | 2 | 2 | 2 | 2 |
| Vulcanization Modifier[5] | 0 | 4 | 8 | 10 | 8 |
| Vulcanization Modifier[6] | 0 | 0 | 0 | 0.1 | 0 |

[1]Budene 1207 from The Goodyear Tire & Rubber Company
[2]bis (alkoxysilylalkyl)polysulfide type, 50% on carbon black
[3]p-phenylene diamines and quinolines
[4]sulfenamides
[5]1,3-bis(citraconimidomethyl)benzene
[6]N-cyclohexylthiophthalimide Example 2

Figure 5:
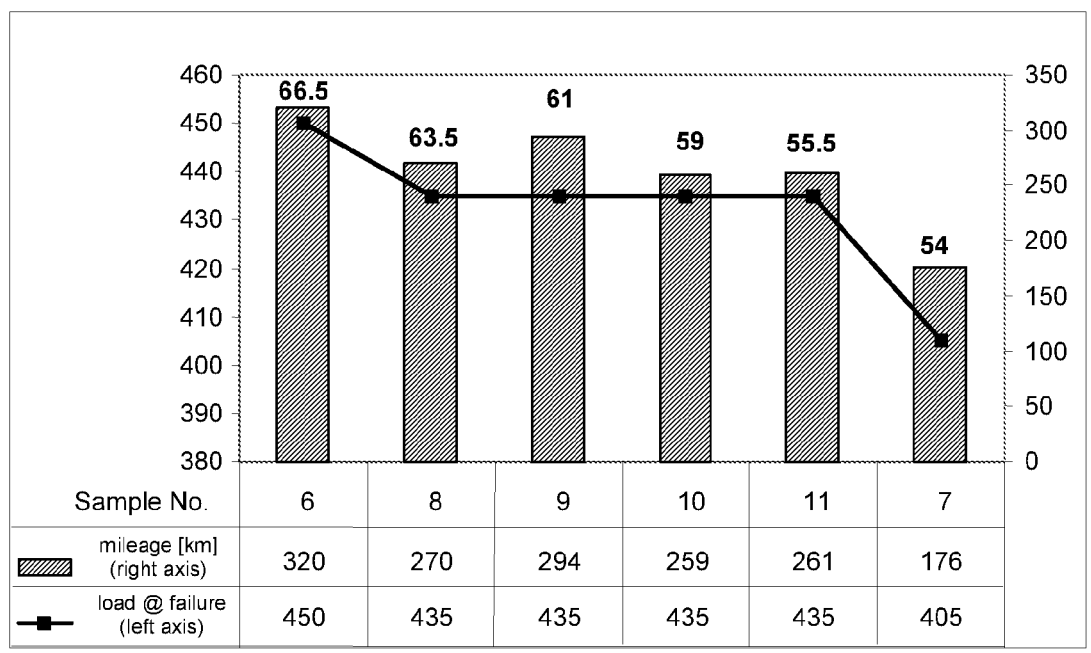
FIG. 5 is a bar graph of runflat mileage at failure for tires made using rubber compositions according to the present invention.

In this example, the effect of a heterogeneous compound insert on the performance of a runflat tire is illustrated. Heterogeneous compounds were prepared by phase mixing varying amounts of Samples 1 and 2 of Example 1 as shown in Table 1. Runflat tires containing inserts made from the heterogeneous compounds were tested for runflat performance and hardness as shown in FIG. 5, with Shore A hardness values give above each bar. Deflated tires were run at constant speed under constant load until failure with recorded distance at failure indicated in FIG. 5.

TABLE 2

| | Sample No. | | | | | |
|---|---|---|---|---|---|---|
| | 6 | 7 | 8 | 9 | 10 | 11 |
| Sample 1, weight percent | 100 | 0 | 20 | 40 | 60 | 80 |
| Sample 2, weight percent | 0 | 100 | 80 | 60 | 40 | 20 |

As seen in FIG. 5, runflat tires made using heterogenous compounds showed lower hardness for more comfortable ride, while maintaining acceptable runflat mileage.

While certain representative embodiments and details have been shown for the purpose of illustrating the invention, it will be apparent to those skilled in this art that various changes and modifications may be made therein without departing from the spirit or scope of the invention.

What is claimed is:

1. A pneumatic runflat tire comprising at least one sidewall insert, the at least one sidewall insert comprising a heterogenous rubber compound comprising first rubber and second rubber composition phases, wherein the second rubber phase is further vulcanizable; wherein the first rubber composition comprises 100 parts by weight of an elastomer comprising from 70 to 90 parts by weight of natural rubber or synthetic polyisoprene, and from 10 to 30 parts by weight of cis-1,4-polybutadiene; and the second rubber composition comprises 100 parts by weight of natural rubber or synthetic polyisoprene, and from 2 to 8 parts by weight of 1,3-bis(citraconimidomethyl)benzene.

2. The pneumatic runflat tire of claim 1, wherein the weight ratio of 1,3-bis(citraconimidomethyl)benzene in the first rubber composition to 1,3-bis(citraconimidomethyl)benzene in the second rubber composition is less than 1:1.

3. The pneumatic runflat tire of claim 1, wherein the heterogenous rubber compound comprises at least part of the first rubber composition phase as a continuous phase and at least part of the second rubber composition phase as a disperse phase dispersed in the at least part of the first rubber composition phase.

4. A pneumatic runflat tire comprising at least one sidewall insert, the at least one sidewall insert comprising a heterogenous rubber compound comprising first rubber and second rubber composition phases, wherein the vulcanization state of the second rubber phase is between its $T_{20}$ and $T_{80}$ vulcanization states; wherein the first rubber composition comprises from 70 to 90 parts by weight of natural rubber or synthetic polyisoprene; and from 10 to 30 parts by weight of cis-1,4-polybutadiene; and the second rubber composition comprises 100 parts by weight of natural rubber or synthetic polyisoprene and from 2 to 8 parts by weight of 1,3-bis(citraconimidomethyl)benzene.

5. The pneumatic runflat tire of claim 2, wherein the weight ratio of 1,3-bis(citraconimidomethyl)benzene in the first rubber composition to 1,3-bis(citraconimidomethyl)benzene in the second rubber composition is less than 1:1.

6. A pneumatic runflat tire comprising at least one sidewall insert, the at least one sidewall insert comprising a heterogenous rubber compound comprising first rubber and second rubber composition phases, wherein the second rubber composition has a first modulus and a second modulus, the first modulus existing after a cure cycle of the tire, and the second modulus obtainable during a runflat condition of the tire, wherein the second modulus is greater than the first modulus, and the modulus of the first rubber composition is greater than the first modulus of the second rubber composition; wherein the first rubber composition comprises from 70 to 90 parts by weight of natural rubber or synthetic polyisoprene; and from 10 to 30 parts by weight of cis-1,4-polybutadiene; and the second rubber composition comprises 100 parts by weight of natural rubber or synthetic polyisoprene and from 2 to 8 parts by weight of 1,3-bis(citraconimidomethyl)benzene.

7. The pneumatic runflat tire of claim 6, wherein the weight ratio of 1,3-bis(citraconimidomethyl)benzene in the first rubber composition to 1,3-bis(citraconimidomethyl)benzene in the second rubber composition is less than 1:1.

\* \* \* \* \*